United States Patent
Kemmochi

(10) Patent No.: US 9,098,947 B2
(45) Date of Patent: Aug. 4, 2015

(54) IMAGE PROCESSING APPARATUS AND IMAGE PROCESSING SYSTEM

(71) Applicant: Eiji Kemmochi, Tokyo (JP)

(72) Inventor: Eiji Kemmochi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 338 days.

(21) Appl. No.: 13/851,271

(22) Filed: Mar. 27, 2013

(65) Prior Publication Data

US 2013/0257905 A1    Oct. 3, 2013

(30) Foreign Application Priority Data

Mar. 30, 2012    (JP) ................................. 2012-082242

(51) Int. Cl.
*G06T 11/60* (2006.01)
*H04L 12/18* (2006.01)
*H04L 12/58* (2006.01)

(52) U.S. Cl.
CPC ............ *G06T 11/60* (2013.01); *H04L 12/1827* (2013.01); *H04L 12/5835* (2013.01)

(58) Field of Classification Search
None
See application file for complete search history.

(56) References Cited

U.S. PATENT DOCUMENTS

| 6,429,856 | B1 | 8/2002 | Omura et al. | |
| 7,703,013 | B1 * | 4/2010 | Bauermeister et al. | 715/255 |
| 2002/0087592 | A1 * | 7/2002 | Ghani | 707/500 |
| 2010/0241432 | A1 | 9/2010 | Michaelis | |
| 2011/0227951 | A1 | 9/2011 | Kubo et al. | |
| 2012/0032976 | A1 | 2/2012 | Nagahara et al. | |
| 2012/0050197 | A1 | 3/2012 | Kemmochi | |
| 2012/0062591 | A1 | 3/2012 | Omura et al. | |
| 2012/0206387 | A1 | 8/2012 | Omura et al. | |
| 2012/0235934 | A1 | 9/2012 | Kawasaki et al. | |

FOREIGN PATENT DOCUMENTS

| EP | 2 023 630 A2 | 2/2009 |
| JP | 2006-091938 | 4/2006 |
| JP | 2007-214722 | 8/2007 |
| JP | 4627781 | 2/2011 |
| JP | 2011-199450 | 10/2011 |
| WO | WO 2011/145539 A1 | 11/2011 |

OTHER PUBLICATIONS

Haller, ("The NiCE Discussion Room: Integrating Paper and Digital Media to Support Co-Located Group Meetings", CHI 2010, Apr. 10-15, 2010, Atlanta, Georgia, USA. Copyright 2010 ACM978-1-60558-929-9/10/04 . . . $10.00).*
Zhang, ("A Mobile Teleconference System for Homecare Services", Proceedings of the 2005 IEEE Engineering in Medicine and Biology 27th Annual Conference Shanghai, China, Sep. 1-4, 2005).*
U.S. Appl. No. 13/677,934, filed Nov. 15, 2012.
U.S. Appl. No 13/688,617, filed Nov. 29, 2012.
Extended European Search Report dated Aug. 16, 2013.

* cited by examiner

*Primary Examiner* — Maurice L McDowell, Jr.
(74) *Attorney, Agent, or Firm* — IPUSA, PLLC

(57) ABSTRACT

An image processing apparatus includes a synthesizing unit which synthesizes a drawn image drawn on a displayed image on a display device with the displayed image; a content data receiving unit which receives content data; a content data conversion unit which converts the received content data to image data; an external snapshot generation unit which generates an external snapshot to be displayed on the display unit based on the converted image data and stores the external snapshot in a storage unit; and a display control unit which displays the synthesized image by the synthesizing unit on the display device and also displays an object corresponding to the external snapshot in a selectable manner so that the external snapshot is displayed on the display device when the object is selected.

9 Claims, 13 Drawing Sheets

IMAGE PROCESSING APPARATUS AND IMAGE PROCESSING SYSTEM

BACKGROUND OF THE INVENTION

1. Field of the Invention

The present invention relates to an image processing apparatus and an image processing system used for an electronic display board or the like.

2. Description of the Related Art

A product so-called an "electronic display board" has been commercially available in which a touch panel function is mounted on a large display having a size of about 40 to 60 inches using a flat panel such as a liquid crystal, plasma or the like, or a projector.

Such a product can display an enlarged screen of a screen of a personal computer by connecting with the personal computer, and is used for a presentation in a conference at an office or an administration or a lecture in an educational institution or the like.

In such an electronic display board, (1) a personal computer operation function using a touch panel is provided. In the personal computer operation function, a personal computer which displays an original screen can be operated by touching the screen of the electronic display board using a mounted touch panel function instead of a mouse operation.

Further, when a personal computer installed with electronic white board application software is connected to the electronic display board, the electronic display board can function as a white board. In this case, (2) a handwriting function via the touch panel is provided. In the handwriting function, handwritten characters can be drawn via the touch panel, or the handwritten characters can be overlapped with a screen from the personal computer.

By using the electronic display board provided with the handwriting function, a memo or the like can be written on a screen while displaying a document for explanation on the screen in a meeting in an office or the like. Then, the memo and the originally displayed document can be recorded together if necessary. Further, by referring to the memo and the originally displayed document at the end of the meeting, the conclusion can be effectively obtained.

It is important for a conference or a meeting using such an electronic display board having such functions, to operate the electronic display board while displaying and inputting necessary data without disturbing the progress of the conference.

However, in the conventional electronic display board, it is a general usage that a notebook PC installed with the white board application software is connected to the electronic display board. Thus, when a participant whose notebook PC is not directly connected to the electronic display board wants to share content from the notebook PC using the electronic display board, it is necessary to release a connection between the originally connected notebook PC, which has been given the handwriting function, and the electronic display board, connect the new notebook PC with the electronic display board, and then activate the white board application software of the new notebook PC. Thus, the above steps are to be repeated in order to share content of plural notebook PCs of the participants by the electronic display board, thereby the progress of the conference has been disturbed.

In order to solve such a problem, in Patent Document 1, a MFP is configured to function as a control PC of an electronic display board, extract sub-contents from source contents sent from PCs or mobile terminals of participants of a conference to the MFP, and rearrange the sub-contents to be displayed on a projector or the like. With this structure, the plural participants of the conference can share the contents within their PCs or the like in accordance with necessity.

However, the technique disclosed in Patent Document 1 is only directed to a display function.

[Patent Document]

[Patent Document 1] Japanese Laid-open Patent Publication No. 2011-199450

SUMMARY OF THE INVENTION

The present invention is made in light of the above problems, and provides an image processing apparatus and an image processing system capable of freely generating and adding a page including content data such as a document file or image data stored in a notebook PC or a mobile terminal of a participant of a conference or a web page being browsed by a browser, as a background image.

According to an embodiment, there is provided an image processing apparatus including a synthesizing unit which synthesizes a drawn image drawn on a displayed image on a display device with the displayed image; a content data receiving unit which receives content data; a content data conversion unit which converts the received content data to image data; an external snapshot generation unit which generates an external snapshot to be displayed on the display unit based on the converted image data and stores the external snapshot in a storage unit; and a display control unit which displays the image synthesized by the synthesizing unit on the display device and also displays an object corresponding to the external snapshot in a selectable manner so that the external snapshot is displayed on the display device when the object is selected.

According to another embodiment, there is provided an image processing system including a display device which displays an image; and an image processing apparatus which supplies an image to the display device, the image processing apparatus including a synthesizing unit which synthesizes a drawn image drawn on the displayed image on a display device with the displayed image; a content data receiving unit which receives content data; a content data conversion unit which converts the received content data to image data; and an external snapshot generation unit which generates an external snapshot to be displayed on the display unit based on the converted image data and stores the external snapshot in a storage unit; and a display control unit which displays the image synthesized by the synthesizing unit on the display device and also displays an object corresponding to the external snapshot in a selectable manner so that the external snapshot is displayed on the display device when the object is selected.

Note that also arbitrary combinations of the above-described constituents, and any exchanges of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Figure 1:
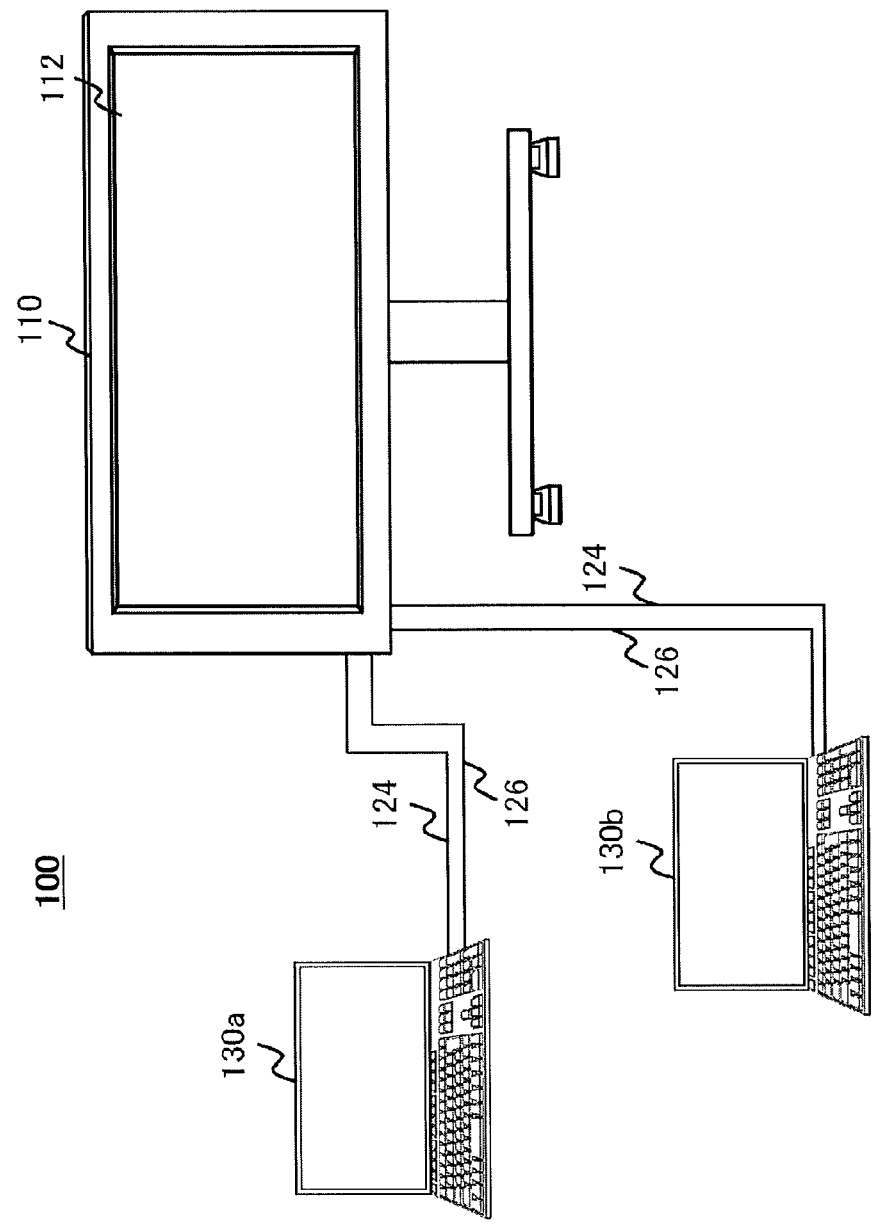
FIG. 1 is a schematic view showing an example of a structure of an image processing system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Structure of Image Processing System)

FIG. 1 is a schematic view showing an example of a structure of an image processing system 100.

In FIG. 1, the image processing system 100 includes an image processing apparatus (electronic display board apparatus) 110 and user PCs 130a and 130b. The user PCs 130a and 130b are connected with the image processing apparatus 110 via cables 124 and 126, respectively.

The image processing apparatus 110 is configured to display displayed images of the user PCs 130a and 130b and a drawn image drawn by a user by a handwriting operation or the like. The image processing apparatus 110 is configured to generate an event by touching of a display unit 112 and send the event to the user PCs 130a and 130b as an event of an input device such as a mouse, a keyboard or the like.

Each of the user PCs 130a and 130b is a data processing apparatus which provides an image to be displayed to the image processing apparatus 110. As the user PCs 130a and 130b have substantially the same structure, the structure and the function of the user PC 130a is explained in the following. The user PC 130a includes an interface for outputting an image signal, and supplies an image signal which forms an image the same as that displayed on a display of the user PC 130a at a predetermined rate (30 frames per second, for example) to the image processing apparatus 110.

In this embodiment, the user PC 130a includes a VGA output terminal (not shown in the drawings) as the interface, and sends a VGA signal to the image processing apparatus 110 via a cable 124 such as a VGA cable or the like. Alternatively, the user PC 130a may send a displayed image via a wireless communication based on various kinds of wireless communication protocols.

Further, the user PC 130a is capable of obtaining an image displayed on the display unit 112 by the image processing apparatus 110 (which will be referred to as a "displayed image"). The user PC 130a may include a USB port (not shown in the drawings), and obtain the displayed image stored in the image processing apparatus 110 connected via a cable 126 such as a USB cable or the like by a general driver such as a USB Mass Storage Class driver or the like.

Although the user PCs 130a and 130b are exemplified as notebook personal computers in FIG. 1, alternatively, the user PCs 130a and 130b may be a data processing apparatus capable of providing image frames such as a desktop personal computer, a tablet personal computer, a PDA, a digital video camera, a digital camera or the like. Although two computers, the user PCs 130a and 130b, are shown in the image processing system 100 in FIG. 1, alternatively, the image processing system 100 may include a single user PC or three or more user PCs.

(Structure of Image Processing Apparatus)

Figure 2:
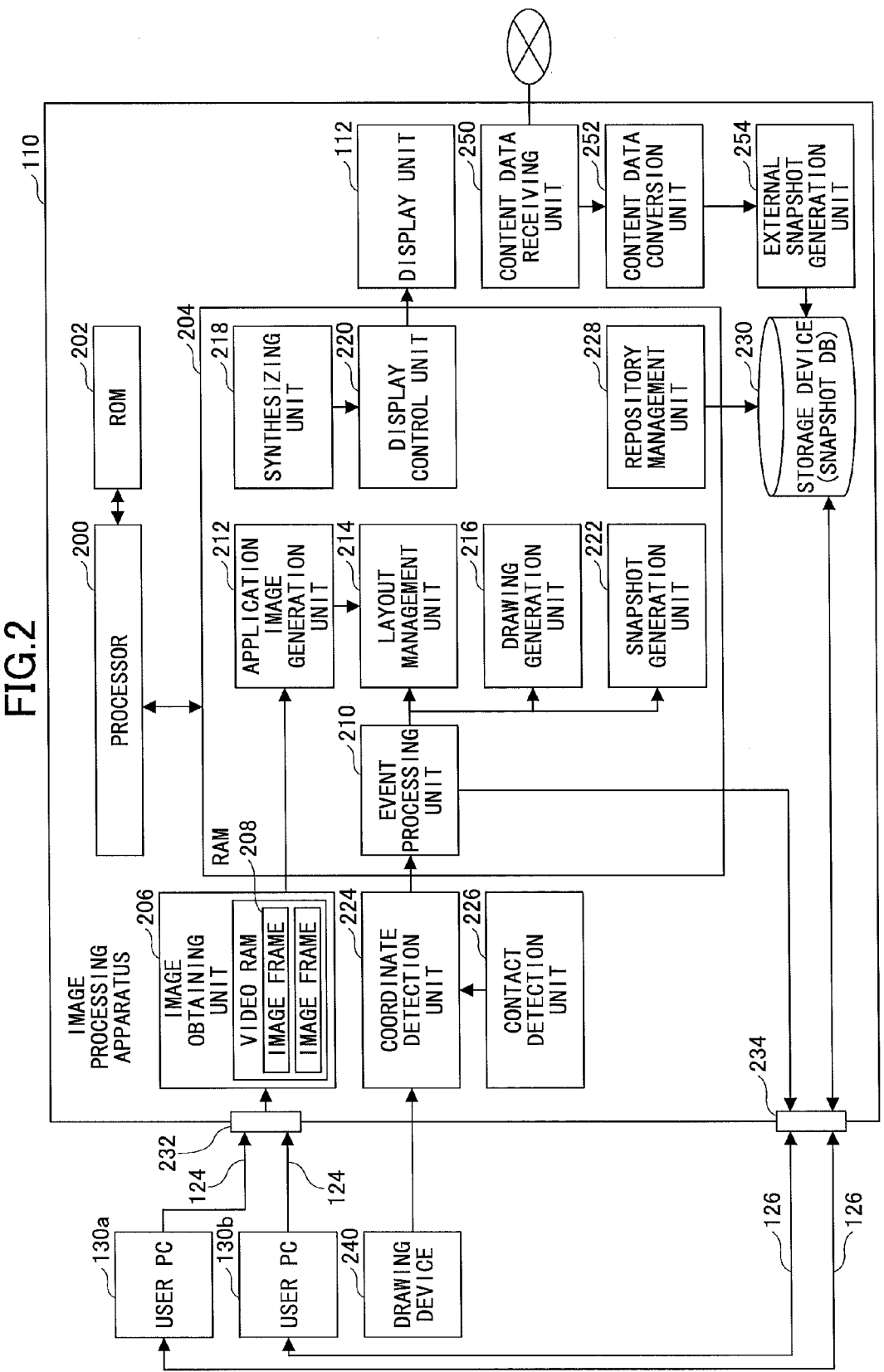
FIG. 2 is a block diagram showing an example of a structure of an image processing apparatus of the embodiment.

FIG. 2 is a block diagram showing an example of a structure of the image processing apparatus 110.

In FIG. 2, the image processing apparatus 110 includes an image input interface 232 and an image input and output interface 234, and is connected to the user PCs 130a and 130b via these interfaces.

The image processing apparatus 110 includes a processor 200, a ROM 202, a RAM 204, an image obtaining unit 206, a coordinate detection unit 224, a contact detection unit 226, the display unit 112, a storage device 230, a content data receiving unit 250, a content data conversion unit 252 and an external snapshot generation unit 254.

The image input interface 232 is an interface which receives an image signal for forming an image the same as that displayed on a display of the user PC 130a or 130b. In this embodiment, a DVI connector composed of a Digital Visual Interface (DVI) terminal may be used as the image input interface 232. The image input interface 232 receives VGA signals via cables 124 such as VGA cables or the like from the user PCs 130a and 130b, and supplies the VGA signals to the image obtaining unit 206 of the image processing apparatus 110. Alternatively, a Video Graphics Array (VGA) connector, a High-Definition Multimedia Interface (HDMI) connector, a Displayport connector or the like may be used. Further alternatively, the image input interface 232 may receive the image signals from the user PCs 130a and 130b by a wireless communication based on a wireless communication protocol such as Bluetooth (registered trademark), WiFi or the like.

The image input and output interface 234 is a physical interface which outputs the displayed image of the image processing apparatus 110 to an external device such as the user PCs 130a and 130b or the like. In this embodiment, a USB socket may be used as the image input and output interface 234.

The processor 200 is a processing and calculation apparatus such as a CPU, a MPU or the like capable of operating an OS such as WINDOWS (registered trademark) series, UNIX (registered trademark), LINUX (registered trademark), TRON, ITRON, μITRON, Chrome, Android or the like to execute the program of the embodiment described in a program language such as assembler, C, C++, Java (registered trademark), JavaScript (registered trademark), PERL, RUBY, PYTHON or the like under control of such an OS. The ROM 202 is a non-volatile memory which stores a boot program such as BIOS or the like.

The RAM 204 is a main memory device such as a DRAM, an SRAM or the like, and provides an execution area for executing the program of the embodiment. The processor 200 reads the program of the embodiment from a hard disk device (not shown in the drawings) for continuously storing software programs or various data and expands in the RAM 204 to execute.

The program includes functions to actualize program modules such as an event processing unit 210, an application image generation unit 212, a layout management unit 214, a drawing generation unit 216, a synthesizing unit 218, a display control unit 220, a snapshot generation unit 222 and a repository management unit 228.

The image obtaining unit 206 has a function to obtain image signals from the user PC 130*a* or 130*b*. Upon receiving the image signals from the user PC 130*a* or 130*b* via the image input interface 232, the image obtaining unit 206 analyzes the image signals. Then, image obtaining unit 206 extracts image information of image frames, which is the displayed images of the user PC 130*a* or 130*b* formed by the image signals, such as resolution, updating frequency of the image frames or the like and sends the image information to the application image generation unit 212.

Further, the image obtaining unit 206 forms image frames of the displayed images of the user PC 130*a* or 130*b* based on the image signals, and overwrites the image frames in a video RAM 208 which temporarily stores the image data, respectively.

The application image generation unit 212 has a function to generate various display windows to be displayed on the display unit 112. The display windows include a display window in which the image frames, which are the displayed images of the user PC 130*a* or 130*b*, are displayed, a display window in which a drawn image generated by a user is displayed, a display window in which buttons, menus or the like for operating various settings of the image processing apparatus 110 are displayed, and a display window for items for applications such as a file viewer, a Web browser or the like. The application image generation unit 212 draws these display windows on an image layer for the respective display window.

The layout management unit 214 has a function to draw the displayed images of the user PC 130*a* or 130*b* in the display window generated by the application image generation unit 212. Upon receiving the image information from the image obtaining unit 206, the layout management unit 214 obtains the image frames stored in the video RAM 208, changes the size of the image frames to be adaptable to a size of the display window generated by the application image generation unit 212 using the image information, and draws the image frames in the image layer to draw the image frames.

The contact detection unit 226 has a function to detect a contact of an object such as a drawing device 240 or the like. In this embodiment, a coordinate input/detection device using an infrared rays shielded method (see Japanese Patent No. 4,627,781, for example) is used as the contact detection unit 226. In the coordinate input/detection device, two light emitting and receiving devices are provided at both side ends at the lower part of the display unit 112. The two light emitting and receiving devices are configured to emit plural infrared rays in a direction parallel to the display unit 112 and receive lights reflected on the same light paths reflected by a reflection member provided around the display unit 112. The contact detection unit 226 sends IR identification data of the infrared rays emitted by the light emitting and receiving devices and shielded by the object to the coordinate detection unit 224. Then, the coordinate detection unit 224 specifies the coordinate position, which is the contacting position of the object based on the IR identification data.

Alternatively, various detecting methods such as a touch panel of an electrostatic capacity type in which the contacting position is specified by detecting a variation in electrostatic capacity, a touch panel of a resistance film type in which the contacting position is specified by detecting a variation in voltage between two facing resistance films, a touch panel of a electromagnetic induction type in which the contacting position is specified by detecting the electromagnetic induction generated by the contact of the object to the display unit or the like may be used.

The coordinate detection unit 224 issues various events as well as calculates the coordinate position, which is the contacting position of the object and the display unit 112. In this embodiment, the coordinate detection unit 224 calculates the coordinate position, which is the contacting position of the object, using the IR identification data of the shielded infrared rays sent from the contact detection unit 226. The coordinate detection unit 224 issues various events with the coordinate position of the contacting position to the event processing unit 210. The events issued by the coordinate detection unit 224 include an event (TOUCH) indicating a contact or an approach of an object, an event (MOVE) indicating a movement of the contacted point or approached point while the object being in contact or in an approached state with the display unit 112 and an event (RELEASE) indicating that the object is away from the display unit 112. These events include coordinate position data indicating a contacted position coordinate or an approached position coordinate.

The drawing device 240 has a function to draw by contacting the contact detection unit 226 of the image processing apparatus 110. The drawing device 240 has a pen shape including a contact detection unit at a front end portion which detects a contact of the object. Then, when the contact detection unit contacts an object, the drawing device 240 sends a contacting signal which indicates a contact with an object with identification data of the drawing device 240 to the coordinate detection unit 224.

Further, the drawing device 240 includes a mode changing switch which changes an image processing apparatus operation mode and a user PC operation mode provided at a side surface, a rear end portion or the like. The image processing apparatus operation mode means a mode in which the user is capable of freely drawing drawings, characters or the like on the display unit 112 of the image processing apparatus 110 and the user is capable of selecting objects such as a menu, buttons or the like displayed on the display unit 112. The user PC operation mode means a mode in which the user PC 130*a* or 130*b* connected to the image processing apparatus 110 can be operated by touching the screen of the display unit 112 using a mounted touch panel function.

For example, when a user contacts the drawing device 240 to the display unit 112 while pressing the mode changing switch, the drawing device 240 sends a mode type signal indicating the user PC operation mode with a contacting signal and identification data of the drawing device 240. When the user contacts the drawing device 240 to the display unit 112 without pressing the mode changing switch, the drawing device 240 outputs a mode type signal indicating the image processing apparatus operation mode with the contacting signal and the identification data of the drawing device 240.

In this embodiment, upon receiving the IR identification data from the contact detection unit 226, the coordinate detection unit 224 calculates the coordinate position, which is the contacting position of the object, and then issues various events when receiving the contacting signal from the drawing device 240. At this time, the coordinate detection unit 224 sends information indicating a type of the mode (hereinafter, referred to as "mode type information") to the event processing unit 210 with the event. In this embodiment, various signals are sent by a short-range wireless communication such as Bluetooth or the like. Alternatively, the various signals may be sent using a wireless communication using ultrasonic or infrared rays.

The event processing unit 210 has a function to process the events issued by the coordinate detection unit 224. When the user PC operation mode is selected, upon receiving the event from the coordinate detection unit 224, the event processing unit 210 sends a mouse event to the user PC 130a or the user PC 130b. When the image processing apparatus operation mode is selected, upon receiving the event from the coordinate detection unit 224, the event processing unit 210 sends a drawing instruction event or a selection notification event to other units of the image processing apparatus 110.

The mouse event is similar to an event issued by an input device such as a mouse or the like of the user PC 130a or 130b, and is issued toward the user PC 130a or 130b by a contact of the drawing device 240 when the user PC operation mode is selected. The event processing unit 210 converts the coordinate position data included in the event issued by the coordinate detection unit 224 to coordinate position data in accordance with a screen size of the user PC 130a or 130b, and sends it to the user PC 130a or 130b with the mouse event. The user PC 130a or 130b processes the event similarly as an event issued by the input device such as the mouse or the like.

The drawing instruction event is an event to instruct the image processing apparatus 110 to draw an image. The drawing instruction event is issued by a contact of the drawing device 240 with the display unit 112 when the image processing apparatus operation mode is selected.

The selection notification event means an event indicating that various objects composing the screen displayed on the display unit 112 such as buttons, a menu bar or the like are selected. The selection notification event is issued by a contact of the drawing device 240 with the display unit 112 when the image processing apparatus operation mode is selected. The event processing unit 210 issues a selection notification event when the coordinate position data included in the event issued by the coordinate detection unit 224 is within the coordinate area of the objects.

In this embodiment, identification data are allocated for the drawing instruction event and the selection notification event, respectively. Each of the functional units of the image processing apparatus 110 which is operated by the event as a trigger refers to the identification data to process various operations. Further, identification data of a selected object is added to the selection notification event, and each of the functional units of the image processing apparatus 110 which is operated by the selection notification event as a trigger refers to the identification data of the object to process various operations.

The drawing generation unit 216 has a function to generate a drawn image drawn by a user using the drawing device 240. The drawing generation unit 216 generates an image layer in which a color of the coordinate position indicated by the coordinate position data is changed to a specific color. The drawing generation unit 216 stores the coordinate position as drawn image information in a respective storing area in the RAM 204.

The synthesizing unit 218 has a function to synthesize various images. The synthesizing unit 218 synthesizes, an image layer in which the application image generation unit 212 is to draw an image (hereinafter, referred to as an "application image layer"), an image layer in which the layout management unit 214 is to draw the displayed image displayed on the user PC 130a or 130b (hereinafter, referred to as an "image capture layer"), and an image layer in which the drawing generation unit 216 is to draw an image (hereinafter, referred to as a "handwriting layer").

The display control unit 220 has a function to control the display unit 112. The display control unit 220 displays the synthesized image generated by the synthesizing unit 218 on the display unit 112. In this embodiment, the synthesizing unit 218 calls the display control unit 220 to display the synthesized image on the display unit 112. Alternatively, the synthesizing unit 218 and the display control unit 220 may synthesize image layers at a frequency the same as the updating frequency of the image frame included in the image data to be displayed on the display unit 112.

The snapshot generation unit 222 has a function to generate a snapshot image, which is a synthesized image of the displayed image of the user PC 130a or 130b and a drawn image generated by the drawing generation unit 216. The snapshot generation unit 222 generates the snapshot image by synthesizing the image capture layer and the handwriting layer upon receiving a selection notification event indicating that the snapshot button (see 308 in FIG. 7, for example) which instructs to obtain the snapshot image displayed on the display unit 112 is selected. When the snapshot generation unit 222 generates the snapshot image, the snapshot generation unit 222 has the repository management unit 228 store the generated snapshot image data, the captured image data in the image capture layer, the handwriting stroke data in the handwriting layer, current time as the generated date, current time as the updated date, an integer value obtained by adding 1 to the maximum order identifier as an order identifier and "false" as an external snapshot flag in the storage device 230 (snapshot DB). The order identifier is added for uniquely identifying each of the snapshot images. The external snapshot flag is added to differentiate a normal snapshot and an external snapshot, which will be explained later. For the normal snapshot, "false" is added.

The repository management unit 228 has a function to control a snapshot DB of the storage device 230 in which the snapshot data is to be stored. The repository management unit 228 stores the snapshot image data, the captured image data in the image capture layer, the handwriting stroke data in the handwriting layer, the generated date, the updated date, the order identifier and the external snapshot flag in the storage device 230 based on an instruction by the snapshot generation unit 222 as described above. Further, the repository management unit 228 stores the currently displayed snapshot image by an instruction by the user with designation of an order identifier. At this time, the repository management unit 228 substitutes the captured image data and the stroke data of the snapshot image allocated with the order identifier designated by the user by the captured image data in the image capture layer and the handwriting stroke data in the handwriting layer and updates the updated date by the current time. When the currently displayed content is not stored as a snapshot image (the order identifier is not designated), the currently displayed content is newly stored. Further, the repository management unit 228 obtains the snapshot image from the storage device 230 based on an instruction from the user PC 130a or 130b and sends the obtained image to the respective user PC 130a or 130b.

The content data receiving unit 250 has a function to receive content data sent by the user via a network to be displayed on the image processing apparatus 110. The received content data is sent to the content data conversion unit 252. The method of receiving the content data is not specifically limited and a general method such as using an electronic mail, uploading to a file server or the like may be used. With this structure, it is convenient for the users as the content data can be stored by a common method of using the electronic mail, uploading to the file server or the like.

When the content data is received by an electronic mail, the participant of the conference sends an electronic mail with content data as an attached file to a previously determined mail address, the content data receiving unit 250 receives the sent electronic mail and extracts the content data attached to the electronic mail. When the content data is received by uploading to a file server, the content data receiving unit 250 may previously start a file upload service using an HTTP server such as Apache or the like and the user may access the file upload service of the image processing apparatus 110 using a browser application such as Google Chrome or the like to upload the content data.

The content data conversion unit 252 has a function to convert the content data sent from the content data receiving unit 250 to image data. The generated image data is sent to the external snapshot generation unit 254. In the content data conversion process, the data format of the content data received in the content data receiving process is determined, and when the content data is in a format capable of extracting the image data, the image data is extracted.

For example, when converting the content data in a PDF format to image data in a PNG format, the image data in the PNG format can be extracted from the PDF file using ImageMagick (see http://www.imagemagick.org/script/index.php). Similarly, for the content data in an image format other than the PNG format, the image data in the PNG format can be extracted by ImageMagick. Further, for the content data in a Power Point format, the content data may be temporarily converted to a PDF file using a PDF conversion tool such as PrimoPDF manufactured by XLsoft Corporation (see http://www.xlsoft.com/jp/products/primopdf/index.html) or the like. Then, the image data in the PNG format can be extracted from the converted PDF file.

The external snapshot generation unit 254 has a function to generate and store snapshot data using the image data sent from the content data conversion unit 252. The external snapshot generation unit 254 performs an external snapshot generation process in which image data set including one or more image data is extracted by converting the content data, and snapshots corresponding to the extracted image data, respectively, are generated and stored in the snapshot DB of the storage device 230.

The structure of the snapshot stored in the snapshot DB includes, snapshot image data having a resolution the same as the display screen size of the image processing apparatus 110 which is obtained by synthesizing the captured image data in the image capture layer and the handwriting stroke data in the handwriting layer, the captured image data in the image capture layer, the handwriting stroke data in the handwriting layer, the generated date of the snapshot image, the updated date of the snapshot image, the order identifier and the external snapshot flag for differentiating the normal snapshot and the external snapshot generated from the content data sent by the participant of the conference.

At this time, a synthesized image of the sent image data is stored as the snapshot image data, the sent image data is stored as the captured image data in the image capture layer, empty data is stored as the handwriting stroke data in the handwriting layer, current time is stored as the generated date and the updated date, an integer value obtained by adding 1 to the maximum order identifier is stored as the order identifier and "true" is stored as the external snapshot flag. The format of each of the image data are not especially defined and may be a general image format such as a PNG format or the like.

(Content Data Receiving Process by Mail)

Figure 3:
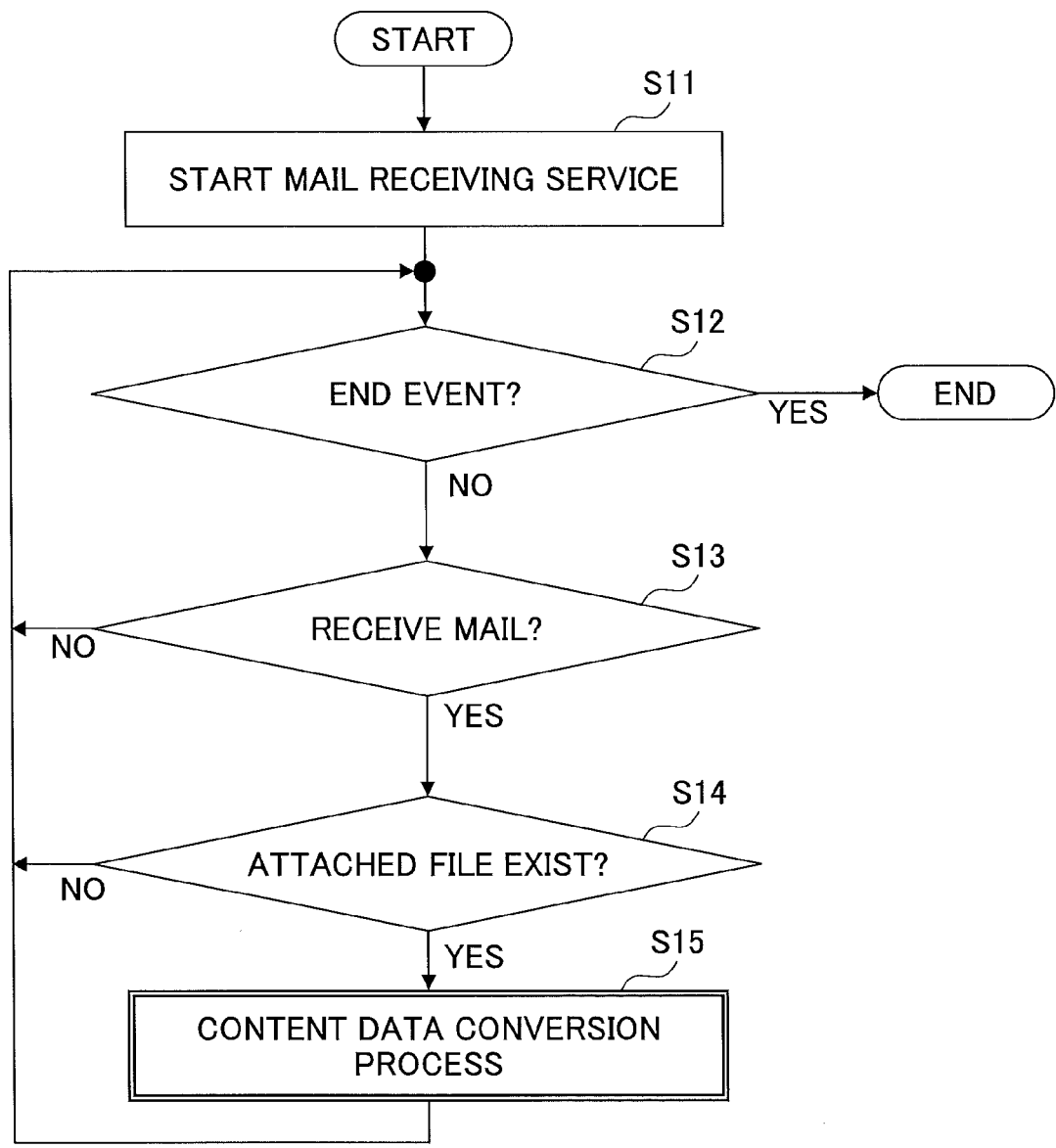
FIG. 3 is a flowchart showing an example of a content data receiving process by mail.

FIG. 3 is a flowchart showing an example of a content data receiving process by a mail.

In FIG. 3, when the image processing apparatus 110 starts the operation, the content data receiving unit 250 starts a mail receiving service (step S11).

Then, the content data receiving unit 250 determines whether an end event of the application of the image processing apparatus 110 is issued (step S12), and ends the process when it is determined that the end event is issued (YES in step S12).

When it is determined that the end event is not issued (NO in step S12), the content data receiving unit 250 determines whether a mail is received (step S13), and returns back to step S12 when it is determined that the mail is not received (NO in step S13).

When it is determined that the mail is received (YES in step S13), the content data receiving unit 250 determines whether an attached file exists for the received mail (step S14), and returns back to step S12 when it is determined that the attached file does not exist (NO in step S14).

When it is determined that the attached file exists (YES in step S14), the content data conversion unit 252 performs a content data conversion process (step S15) and returns back to step S12. The content data conversion process will be explained later in detail.

(Content Data Receiving Process by File Upload)

Figure 4:
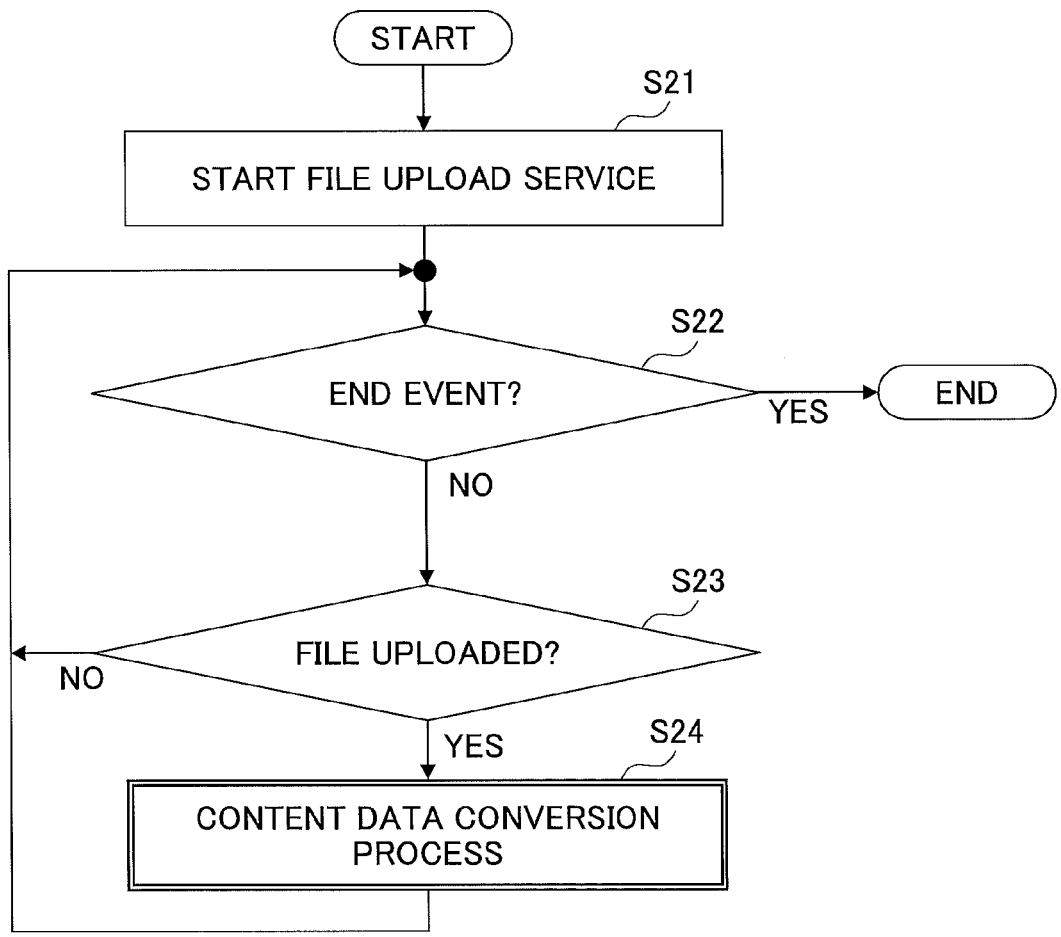
FIG. 4 is a flowchart showing an example of a content data receiving process by file upload.

FIG. 4 is a flowchart showing an example of a content data receiving process by file upload.

In FIG. 4, when the image processing apparatus 110 starts the operation, the content data receiving unit 250 starts a file upload service (step S21).

Then, the content data receiving unit 250 determines whether an end event of the application of the image processing apparatus 110 is issued (step S22), and ends the process when it is determined that the end event is issued (YES in step S22).

When it is determined that the end event is not issued (NO in step S22), the content data receiving unit 250 determines whether a file is uploaded (step S23), and returns back to step S22 when it is determined that the file is not uploaded (NO in step S23).

When it is determined that the file is uploaded (YES in step S23), the content data conversion unit 252 performs a content data conversion process (step S24), and returns back to step S22. The content data conversion process will be explained later in detail.

(Content Data Conversion Process)

Figure 5:
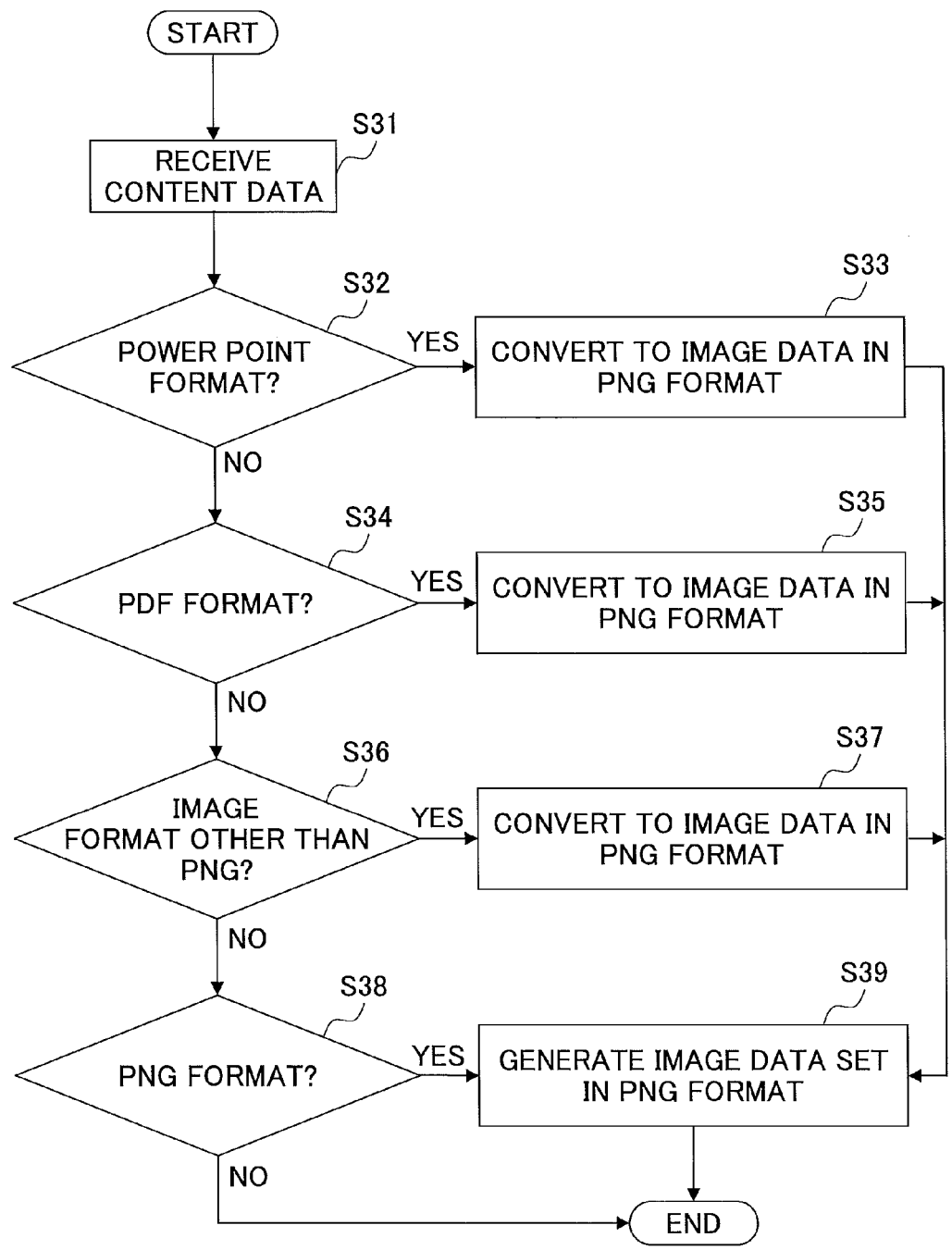
FIG. 5 is a flowchart showing an example of a content data conversion process.

FIG. 5 is a flowchart showing an example of the content data conversion process (step S15 in FIG. 3, and step S24 in FIG. 4).

In FIG. 5, when starting the operation, the content data conversion unit 252 obtains the content data from the content data receiving unit 250 (step S31).

Then, the content data conversion unit 252 determines whether the content data is in a Power Point format (step S32).

When it is determined that the content data is in the Power Point format (YES in step S32), the content data conversion unit 252 converts each slide of the Power Point file to image data in a PNG format (step S33) to generate an image data set in the PNG format (step S39), and ends the operation.

When it is determined that the content data is not in the Power Point format (NO in step S32), the content data conversion unit 252 determines whether the content data is in a PDF format (step S34).

When it is determined that the content data is in the PDF format (YES in step S34), the content data conversion unit 252 converts each page of the PDF file to image data in the PNG format (step S35) to generate an image data set in the PNG format (step S39), and ends the operation.

When it is determined that the content data is not in the PDF format (NO in step S34), the content data conversion unit 252 determines whether the content data is in an image format other than the PNG format (step S36).

When it is determined that the content data is in the image format other than the PNG format (YES in step S36), the content data conversion unit 252 converts the image file to the image data in the PNG format (step S37) to generate an image data set in the PNG format (step S39), and ends the operation.

When it is determined that the content data is not in the image format other than the PNG format (NO in step S36), the content data conversion unit 252 determines whether the content data is in the PNG format (step S38).

When it is determined that the content data is in the PNG format (YES in step S38), the content data conversion unit 252 generates an image data set in the PNG format (step S39), and ends the operation.

When it is determined that the content data is not in the PNG format (NO step S38), the content data conversion unit 252 ends the operation.

(External Snapshot Generation Process)

Figure 6:
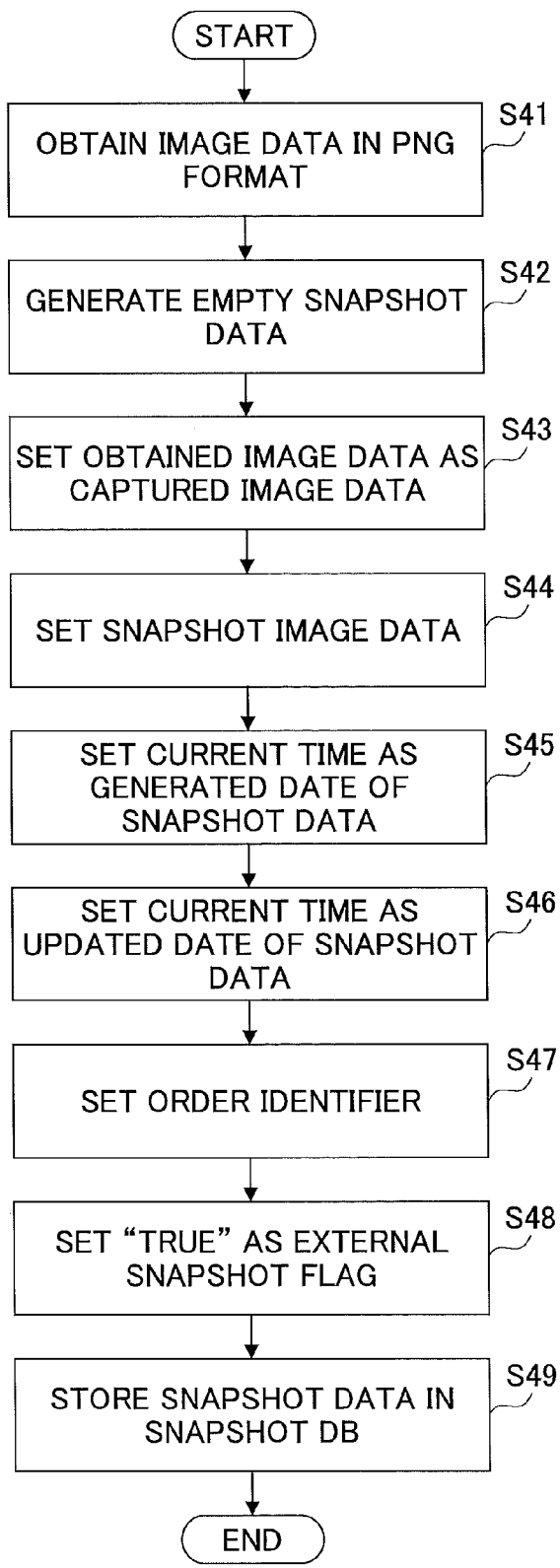
FIG. 6 is a flowchart showing an example of an external snapshot generation process.

FIG. 6 is a flowchart showing an example of an external snapshot generation process.

In FIG. 6, when starting the operation, the external snapshot generation unit 254 obtains the image data in the PNG format from the content data conversion unit 252 (step S41).

Then, the external snapshot generation unit 254 generates empty snapshot data (step S42).

Then, the external snapshot generation unit 254 sets (or registers) the obtained image data as captured image data of the generated snapshot data (step S43).

Then, the external snapshot generation unit 254 synthesizes the obtained image data to generate snapshot image data and sets the generated snapshot image data as snapshot image data of the snapshot data (step S44).

Then, the external snapshot generation unit 254 sets the current time as the generated date of the snapshot data (step S45).

Then, the external snapshot generation unit 254 sets the current time as the updated date of the snapshot data (step S46).

Then, the external snapshot generation unit 254 sets a number value obtained by adding 1 to the maximum order identifier as the order identifier of the snapshot data (step S47).

Then, the external snapshot generation unit 254 sets "True" as the external snapshot flag of the snapshot data (step S48).

Then, the external snapshot generation unit 254 stores the snapshot data in the snapshot DB (step S49), and ends the operation.

Application Example

Figure 7:
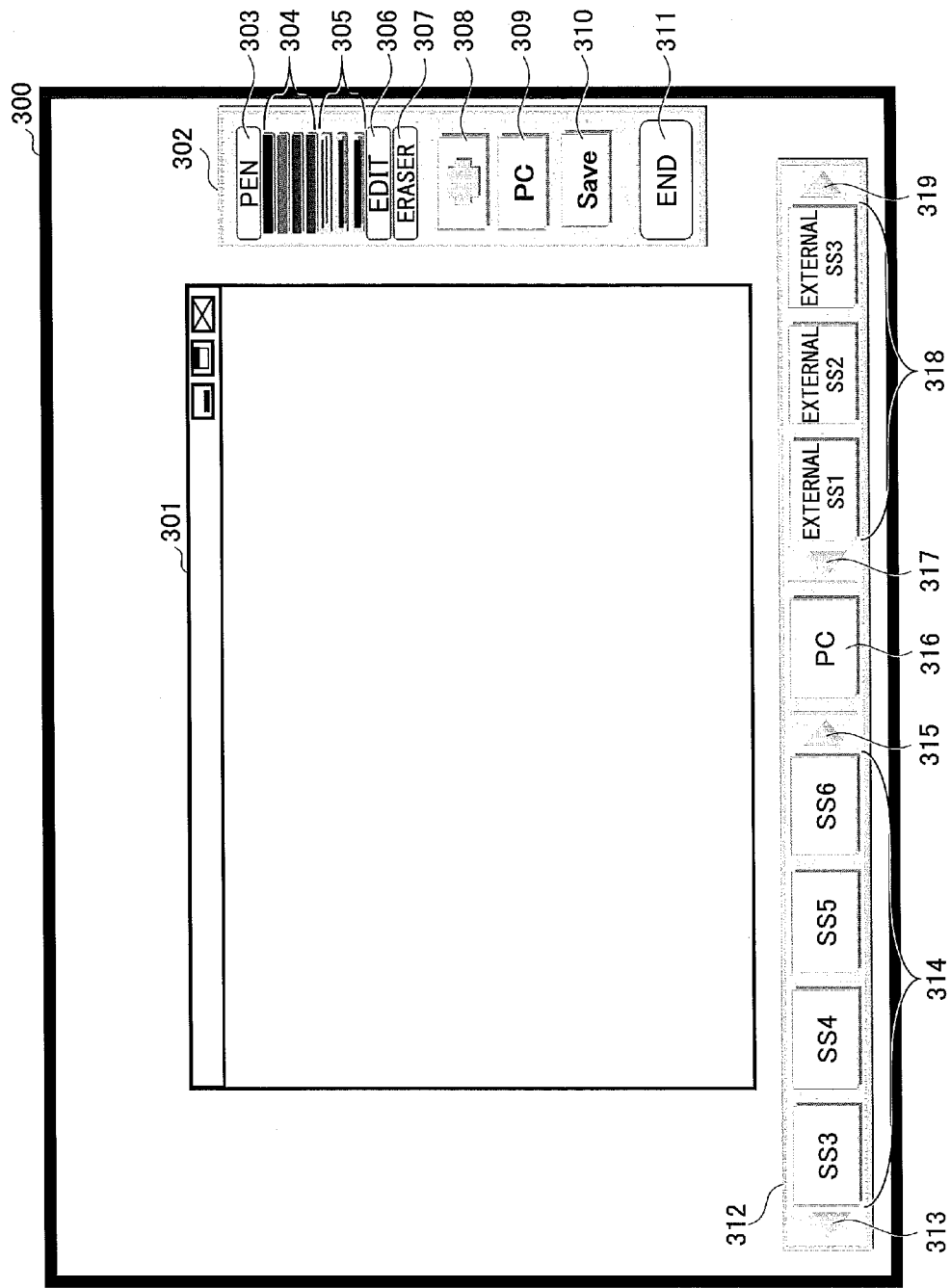
FIG. 7 is a view showing an example of an application screen.

FIG. 7 is a view showing an example of an application screen 300 displayed on the display unit 112 of the image processing apparatus 110.

Hereinafter, an operation method is explained based on electronic white board application software (electronic display board application software) operated on the image processing apparatus 110. Although not specifically explained, the electronic white board application software may be used on Microsoft Windows 7 as an OS of the PC composing the image processing apparatus 110, and Microsoft Windows Presentation Foundation (WPF) may be used as a development platform of the application.

First, a user directly operates the screen of the display unit 112 using a pen device or the like.

In the screen, an operation button bar 302 and a snapshot bar 312 are provided and the area other than the operation button bar 302 and the snapshot bar 312 is referred to as a "screen area" hereinafter. First, functions of buttons of the operation button bar 302 are explained.

When the user presses a drawing button 303 (pen) of the operation button bar 302 and taps and drags the screen area, the user can draw an object to form a drawn stroke. Here, the object is drawn by tapping and dragging the screen area until the user presses an edit button 306 or a delete button 307 (eraser).

When the user presses the edit button 306 of the operation button bar 302 and taps and drags a drawn stroke within the screen area, the drawn stroke is selected. At this time, the user can edit (enlarge, shrink or move) the selected drawn stroke (selected area). Here, at this time, the edition within the screen area is performed until the user presses the drawing button 303 or the delete button 307.

When the user presses the delete button 307 of the operation button bar 302 and taps and drags like crossing a drawn stroke within the screen area, the drawn stroke is deleted. Here, at this time, the deletion within the screen area is performed until the user presses the drawing button 303 or the edit button 306.

There is provided pen color selection buttons 304 for black, red, blue and green in the operation button bar 302, for example. When the user presses one of the pen color selection buttons 304, the color of a drawn stroke when drawing is changed to the selected color.

When the user presses a pen width selection button 305 of the operation button bar 302, the width of a drawn stroke when drawing is changed.

When the user presses a connected PC screen display button 309 (PC) of the operation button bar 302, a connected PC screen 301, which is the same as a screen displayed on the display of the connected PC, is displayed. The data capable of displaying the connected PC screen 301 is managed also as a snapshot. This snapshot corresponds with a connected PC screen display button 316 of the snapshot bar 312, which will be explained later, and is differentiated from the normal snapshots. Further, when a PC is not connected to the image processing apparatus 110 or when a previously stored snapshot is already displayed, the connected PC screen display button 309 is not available.

When the user presses a snapshot button 308 of the operation button bar 302, a new snapshot is generated based on the content displayed in the screen area and the generated snapshot is stored. Then, the stored snapshot is displayed as one of snapshot display buttons 314 in the snapshot bar 312. Here, for the generated snapshot, "false" is set for the external snapshot flag.

When the user presses a snapshot save button 310 of the operation button bar 302, snapshot images of all the stored snapshots are further stored in a storage device designated by the user such as a USB memory, a network drive or the like. Further, the snapshot images may be sent by a mail as an attached file.

Next, functions of buttons of the snapshot bar 312 are explained. The snapshot bar 312 includes plural snapshot display buttons 314, the connected PC screen display button 316, and plural external snapshot display buttons 318. The snapshot display buttons 314 correspond with normal snapshots, respectively. Here, the normal snapshot means a snapshot whose external snapshot flag is set to "false". The external snapshot display buttons 318 correspond with external snapshots, respectively. As described above, for the external snapshot, the external snapshot flag is set to "true". Further, the snapshot display buttons 314, the connected PC screen display button 316, and the external snapshot display buttons 318 are provided with thumbnails of the corresponding snapshot images, respectively.

When the user presses one of the snapshot display buttons 314 of the snapshot bar 312, the snapshot corresponding with the pressed snapshot display button 314 is displayed as a screen. When the displayed snapshot (screen) is changed to another snapshot, the previously displayed snapshot (screen) is automatically stored and updated.

Then, when the user presses snapshot list switching buttons 313 and 315 of the snapshot bar 312, the snapshot display buttons 314 displayed in the snapshot bar 312 are scrolled and the snapshot display button 314 currently not shown is displayed. For example, it is assumed that there are snapshots provided with the order identifiers from 1 to 10, respectively. At this time, when the snapshot list switching button 313 provided at the left side in FIG. 7 is pressed, the snapshot display buttons 314 (SS4 to SS6) are shifted leftward and the snapshot display button 314 (SS3) at the left end disappears, and a new snapshot display button 314 (SS7) is displayed next to the snapshot display button 314 (SS6). Similarly, when the snapshot list switching button 315 provided at the right side in FIG. 7 is pressed, the snapshot display buttons 314 (SS3 to SS5) are shifted rightward and the snapshot display button 314 (SS6) at the right end disappears, and a new snapshot display button 314 (SS2) is displayed next to the snapshot display button 314 (SS3). Further, even when the snapshot list switching button 313 or 315 is pressed, if there is no new snapshot display button 314 to be displayed, the displayed snapshot display buttons 314 are not changed.

Then, when the user presses the connected PC screen display button 316 of the snapshot bar 312, the connected PC screen 301 is displayed. Here, similar to the normal snapshots corresponded with the snapshot display buttons 314, respectively, when the displayed snapshot (screen) is changed, the previously displayed snapshot (screen) is automatically stored and updated.

Then, when the user presses one of the external snapshot display buttons 318 of the snapshot bar 312, the external snapshot corresponds with the pressed snapshot display button 318 is displayed as a screen. At this time, the external snapshot is changed to a normal snapshot (the external snapshot flag is changed from "true" to "false"), the changed normal snapshot corresponds with a new snapshot display button 314 and the pressed external snapshot display button 318 becomes not available anymore. At this time, the newly corresponding snapshot display button 314 is displayed in the snapshot bar 312. Further, similar to above, when the displayed snapshot (screen) is changed, the previously displayed snapshot (screen) is automatically stored and updated.

Then, when the user presses external snapshot list switching buttons 317 and 319 of the snapshot bar 312, the external snapshot display buttons 318 displayed in the snapshot bar 312 are scrolled and the external snapshot display button 318 currently not shown is displayed. Further, even when the external snapshot list switching button 317 or 319 is pressed, if there is no new external snapshot display button 318 to be displayed, the displayed external snapshot display buttons 318 are not changed.

Screen Example

Figure 8:
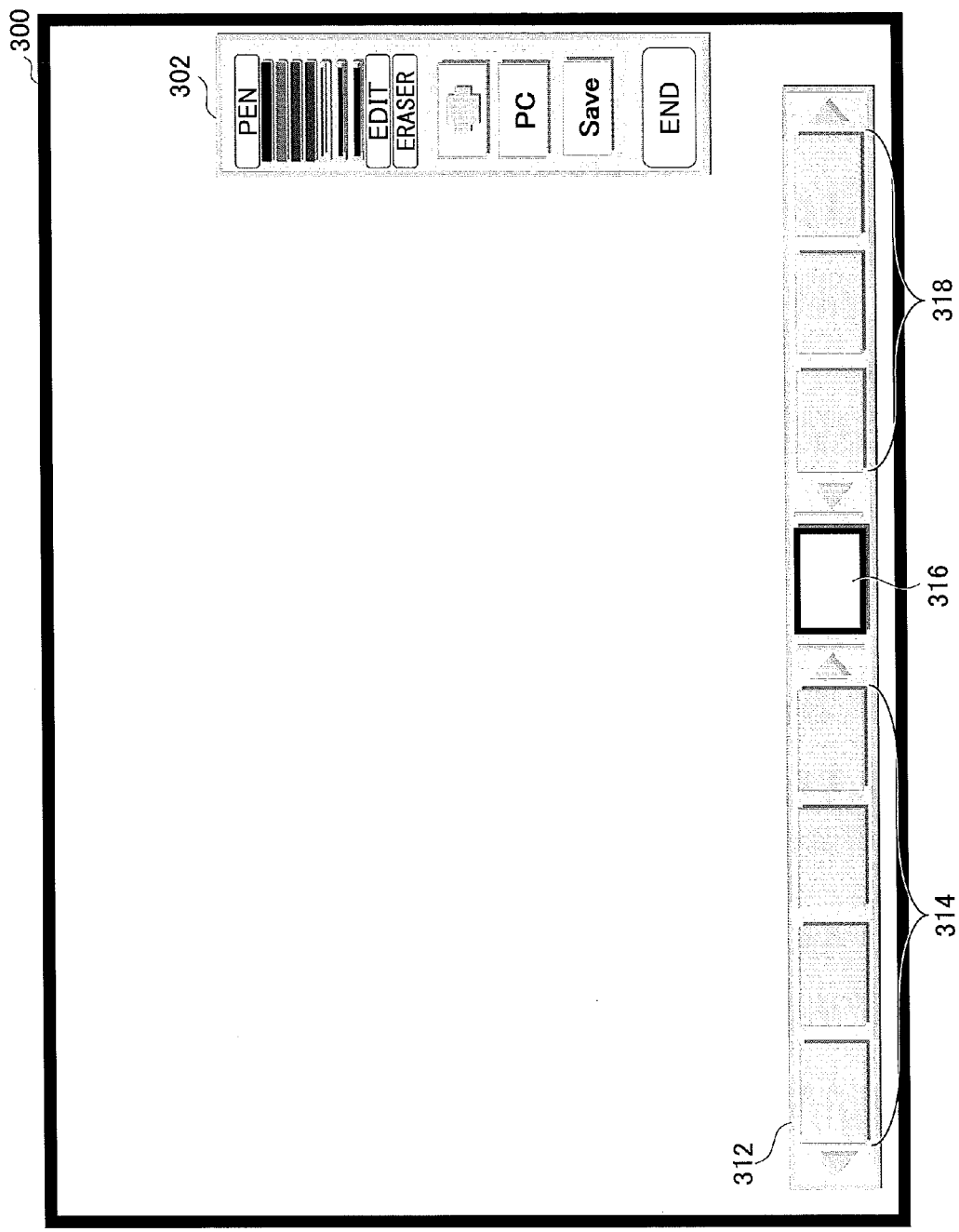
FIG. 8 is a view showing an example of the application screen.

FIG. 8 is a view showing an example of an initial screen of the application screen 300 immediately after the white board application software is activated. At this time, only the operation button bar 302 and the snapshot bar 312 are displayed on the screen. Further, at this time, the connected PC screen display button 316 is highlighted in order to notify users that the connected PC screen can be displayed. Further, as the snapshot and the external snapshot are not stored right after the activation, the snapshot display buttons 314 and the external snapshot display buttons 318 of the snapshot bar 312 are empty (blank).

Figure 9:
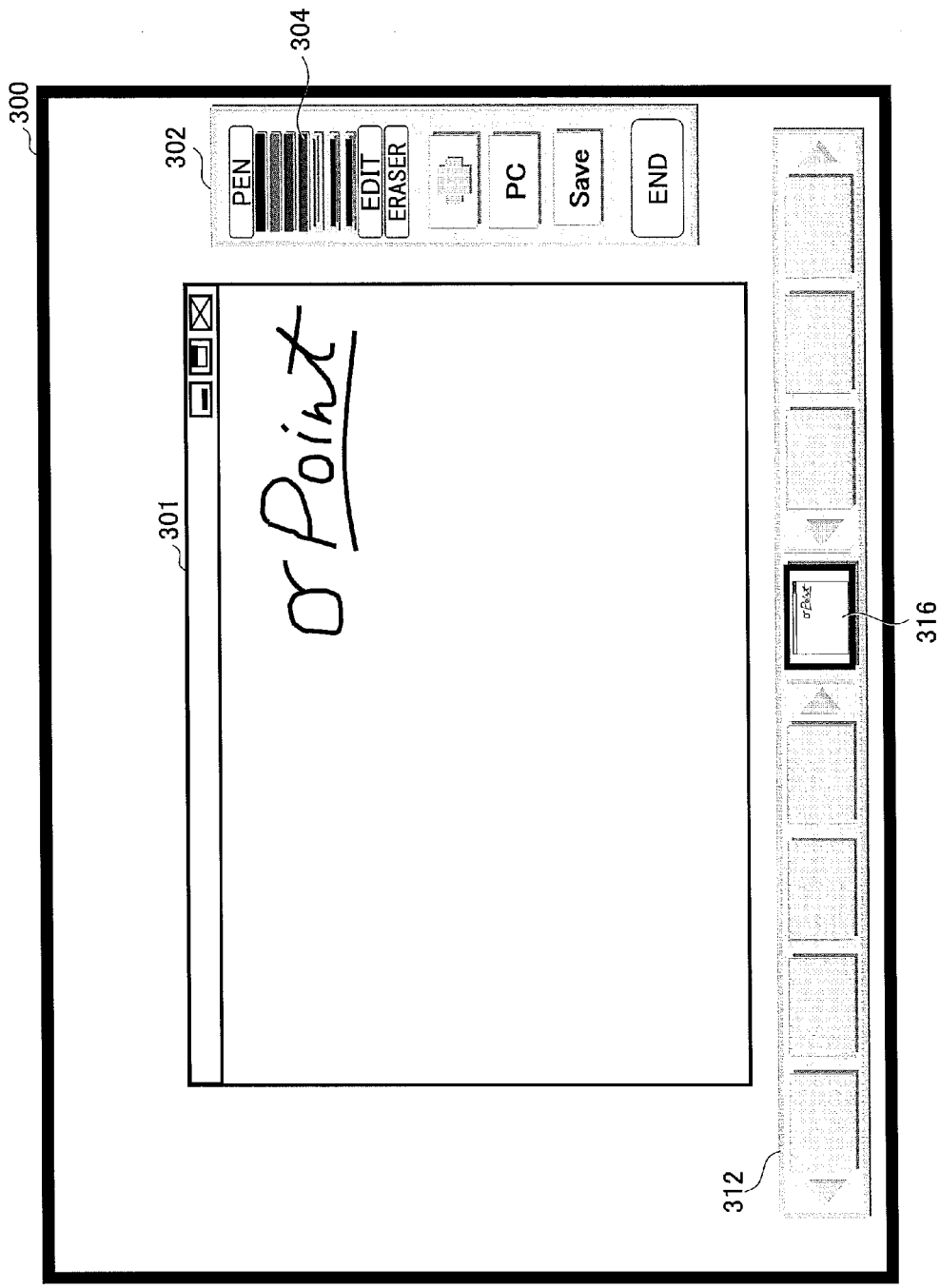
FIG. 9 is a view showing another example of the application screen.

FIG. 9 is a view showing another example of the application screen 300.

For this case, first, a video cable of the image processing apparatus 110 is connected to a video output terminal of a notebook PC of the user. Then, the connected PC screen display button 316 in the snapshot bar 312 is pressed and the connected PC screen 301 is displayed. Thereafter, the screen area is tapped and dragged after the pen color selection button 304 (blue) of the operation button bar 302 is selected to draw a handwritten stroke "Point" on the connected PC screen 301.

Figure 10:
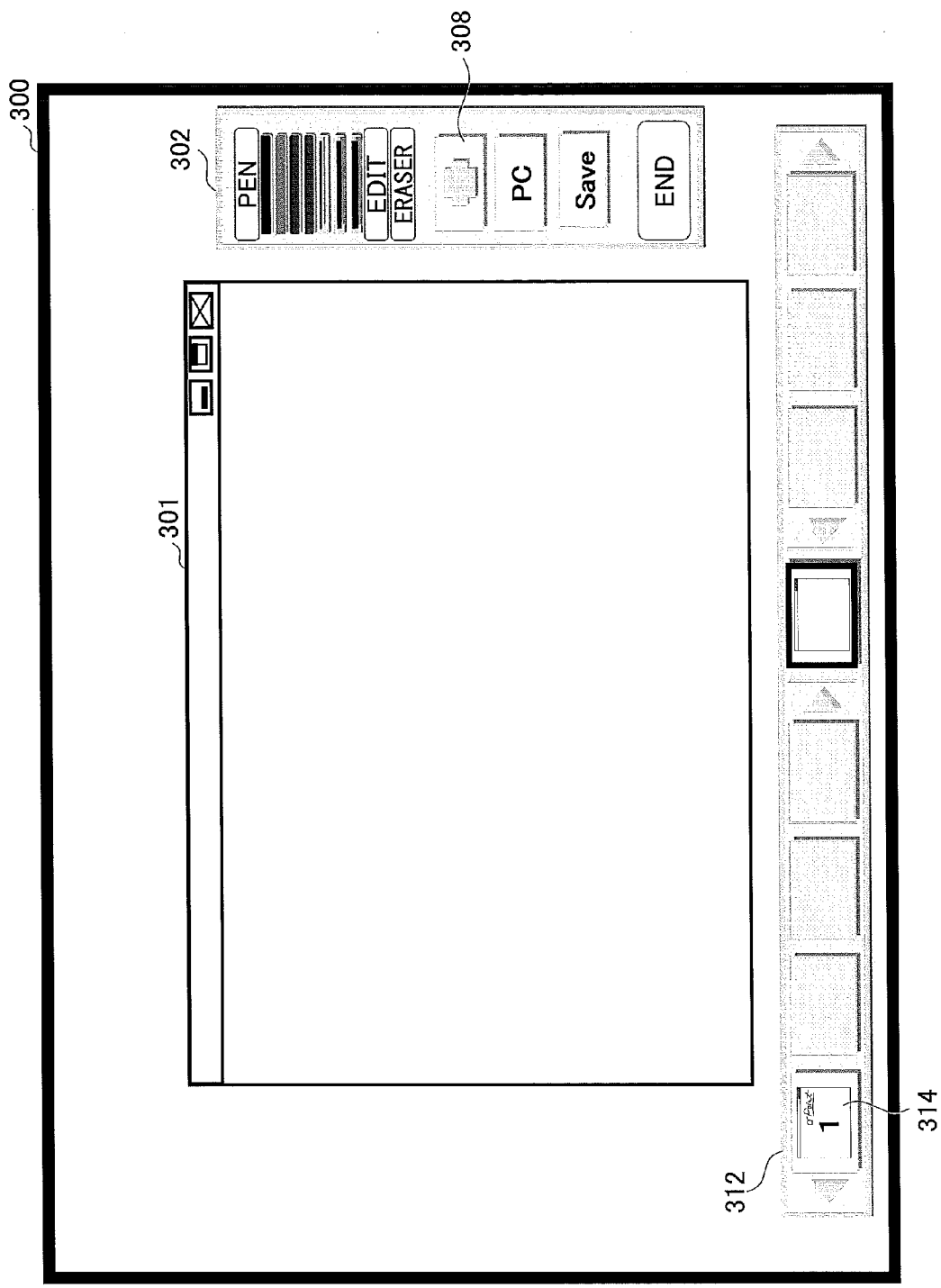
FIG. 10 is a view showing another example of the application screen.

FIG. 10 a view showing another example of the application screen 300.

For this case, while displaying content on the display area, the snapshot button 308 of the operation button bar 302 is pressed so that the currently displayed content is stored as a snapshot. Then, the snapshot display button 314 on which a thumbnail of the snapshot image is displayed in the snapshot bar 312. Further, it is possible to store only the connected PC screen 301 after deleting the drawn stroke on the display screen in accordance with a predetermined instruction by the user. When the user presses the generated snapshot display button 314, the snapshot corresponded with the pressed snapshot display button 314 is displayed as a screen.

Figure 11:
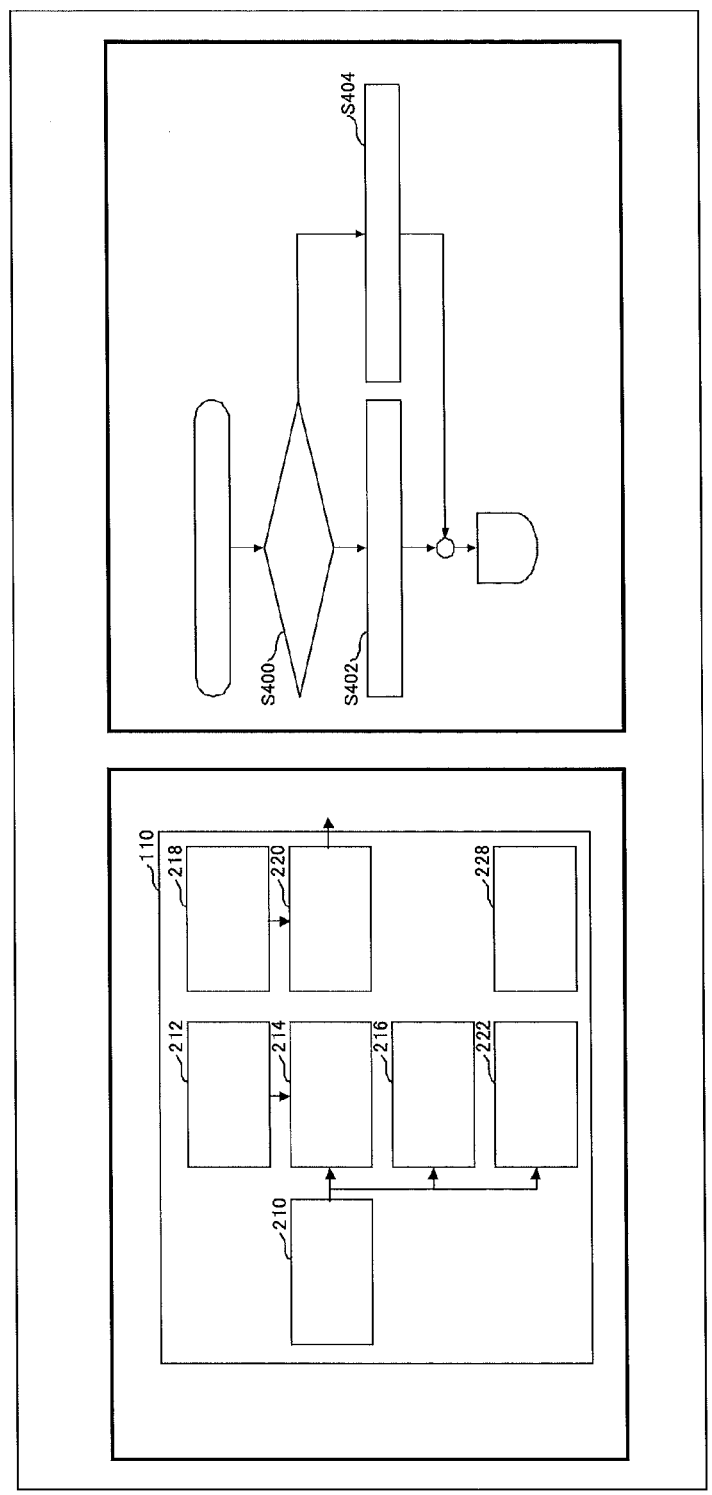
FIG. 11 is a schematic view showing an example of an attached file.

FIG. 11 is a schematic view showing an example of an attached file.

When a participant of a conference wants to share a Power Point file by the image processing apparatus 110, the participant sends the Power Point file from a notebook PC of own to a previously determined mail address as an attached file. Here it is assumed that the Power Point file includes two pages of slide image.

Figure 12:
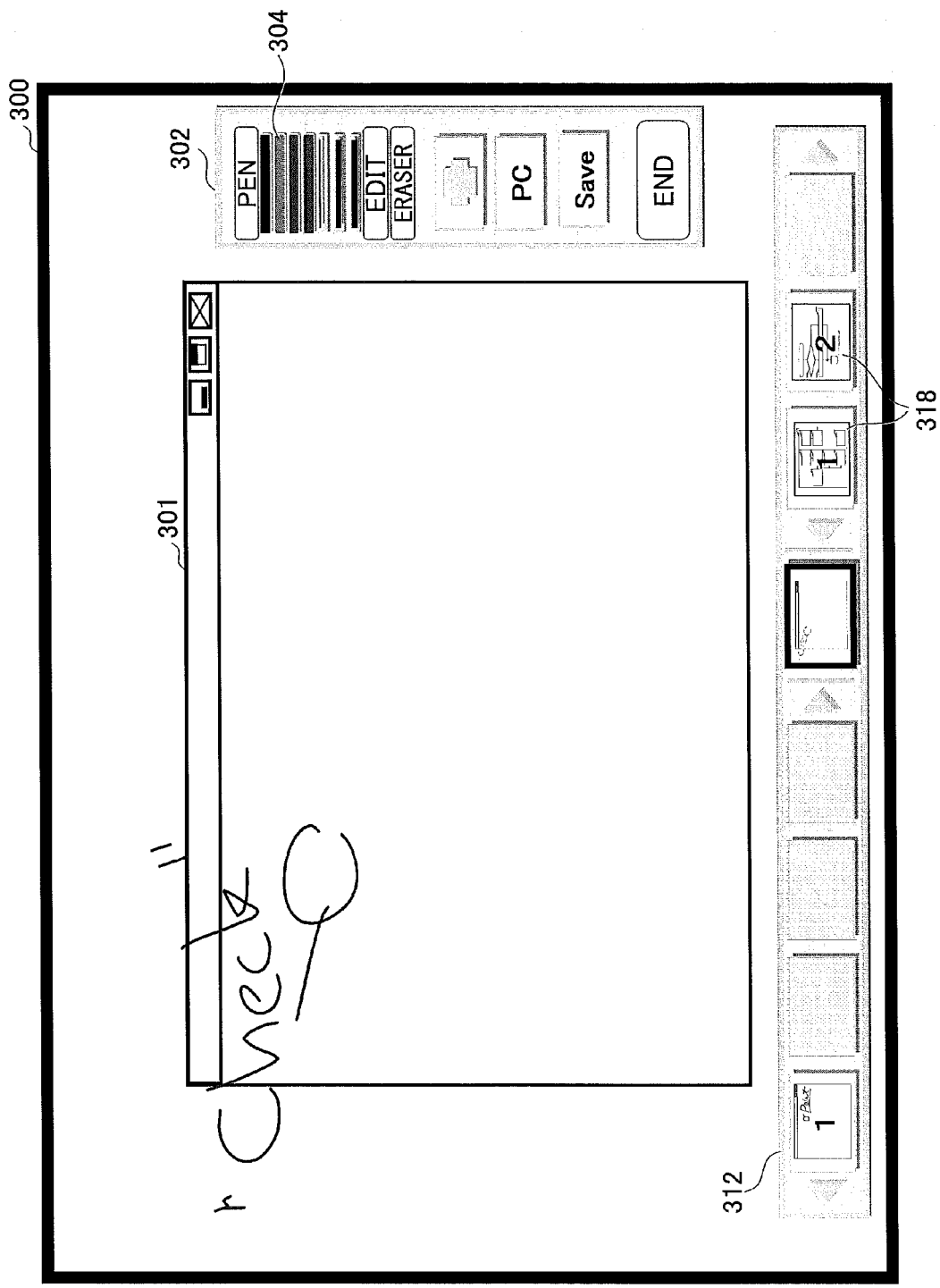
FIG. 12 is a view showing another example of the application screen.

FIG. 12 is a view showing another example of the application screen 300.

For this case, the user of the image processing apparatus 110 selects the pen color selection button 304 (red) of the operation button bar 302, taps and drags the screen area on the connected PC screen 301 to draw a handwritten stroke "Check". Meanwhile, the image processing apparatus 110 receives the Power Point file explained above with reference to FIG. 11. Then, the image processing apparatus 110 converts the two pages of slide images included in the received Power Point file to image data, respectively, and generates and stores two external snapshots. Thus, two external snapshot display buttons 318 corresponding to the generated two external snapshots are displayed in the snapshot bar 312.

Figure 13:
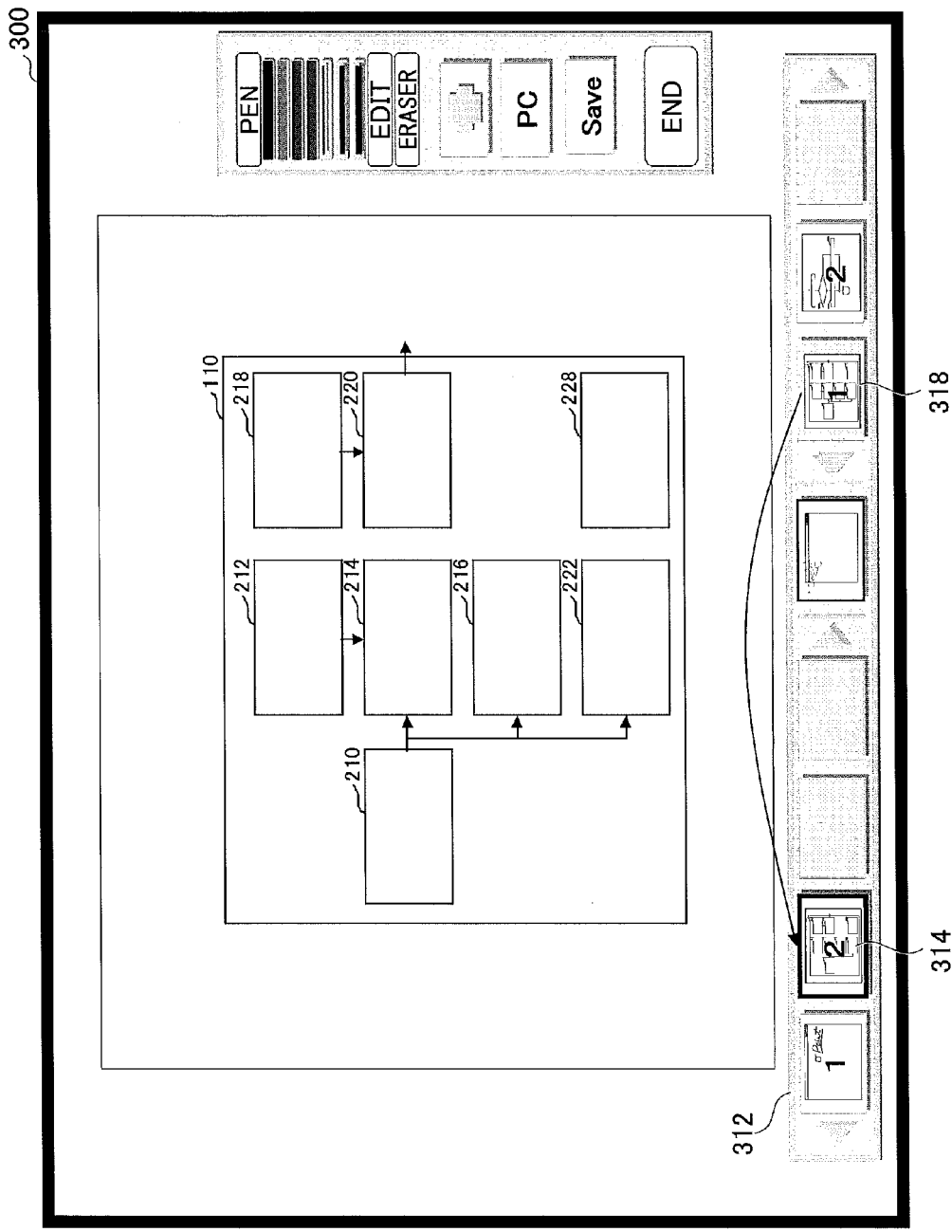
FIG. 13 is a view showing another example of the application screen.

FIG. 13 is another example of the application screen 300.

For this case, the external snapshot display button 318 of the snapshot bar 312 is pressed so that the external snapshot corresponding with the pressed external snapshot display button 318 is displayed as a screen. When the external snapshot display button 318 is pressed, the external snapshot flag of the corresponding external snapshot becomes "false" and the external snapshot is changed to a normal snapshot corresponding with the snapshot display button 314. Thus, the pressed external snapshot display button 318 is unable to be used and a new snapshot display button 314 on which a thumbnail of the corresponding snapshot is added. Further, at this time, the newly added snapshot display button 314 is highlighted to show that the corresponding snapshot is currently being displayed.

As described above, according to the present embodiment, a snapshot including content data for which a participant of a conference wants to share can be added without disturbing an operation of a user of the image processing apparatus 110.

According to the image processing apparatus of the embodiment, a page including content data such as a document file or image data stored in a notebook PC or a mobile terminal of a participant of a conference or a web page being browsed by a browser, as a background image can be freely generated and added.

Although a preferred embodiment of the image processing apparatus and an image processing system has been specifically illustrated and described, it is to be understood that minor modifications may be made therein without departing from the spirit and scope of the invention as defined by the claims.

The individual constituents of the image processing apparatus 110 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

The present invention is not limited to the specifically disclosed embodiments, and variations and modifications may be made without departing from the scope of the present invention.

The present application is based on Japanese Priority Application No. 2012-082242 filed on Mar. 30, 2012, the entire contents of which are hereby incorporated by reference.

What is claimed is:

1. An image processing apparatus comprising:
   a synthesizing unit which synthesizes a drawn image drawn on a displayed image on a display device with the displayed image;
   a content data receiving unit which receives content data;
   a content data conversion unit which converts the received content data to image data; and
   an external snapshot generation unit which generates an external snapshot to be displayed on the display device based on the image data and stores the external snapshot in a storage unit; and
   a display control unit which displays the image synthesized by the synthesizing unit on the display device and also displays an object corresponding to the external snapshot in a selectable manner so that the external snapshot is displayed on the display device when the object is selected.

2. The image processing apparatus according to claim 1, wherein the content data receiving unit receives attached data of an electronic mail as the content data.

3. The image processing apparatus according to claim 1, wherein the content data receiving unit receives a data file uploaded as the content data.

4. The image processing apparatus according to claim 1, wherein the object corresponding to the external snapshot is a button on which a thumbnail of the external snapshot is displayed.

5. The image processing apparatus according to claim 1, wherein the display control unit displays a snapshot bar including plural objects corresponding to snapshots of images synthesized by the synthesizing unit, respectively, and the object corresponding to the external snapshot is also included in the snapshot bar.

6. An image processing system comprising:
   a display device which displays an image; and
   an image processing apparatus which supplies an image to the display device,
   the image processing apparatus including
   a synthesizing unit which synthesizes a drawn image drawn on the displayed image on a display device with the displayed image;
   a content data receiving unit which receives content data;
   a content data conversion unit which converts the received content data to image data; and
   an external snapshot generation unit which generates an external snapshot to be displayed on the display device based on the image data and stores the external snapshot in a storage unit; and
   a display control unit which displays the image synthesized by the synthesizing unit on the display device and also displays an object corresponding to the external snapshot in a selectable manner so that the external snapshot is displayed on the display device when the object is selected.

7. The image processing system according to claim 6, wherein the object corresponding to the external snapshot is a button on which a thumbnail of the external snapshot is displayed.

8. The image processing system according to claim 6, wherein the display control unit displays a snapshot bar including plural objects corresponding to snapshots of images synthesized by the synthesizing unit, respectively, and the object corresponding to the external snapshot is also included in the snapshot bar.

9. A non-transitory computer-readable recording medium having recorded thereon a program that causes a computer to execute an image processing method comprising:
   synthesizing a drawn image drawn on a displayed image on a display device with the displayed image;
   receiving content data;
   converting the received content data to image data; and
   generating an external snapshot to be displayed on the display device based on the image data and stores the external snapshot in a storage unit; and
   displaying the synthesized image on the display device and also displaying an object corresponding to the external snapshot in a selectable manner so that the external snapshot is displayed on the display device when the object is selected.

* * * * *